Patented June 16, 1936

2,044,432

UNITED STATES PATENT OFFICE 2,044,432

MANUFACTURE OF ARTIFICIAL SILK

Johan D. W. Hubbeling, Enka, N. C., assignor to American Enka Corporation, Enka, N. C., a corporation of Delaware No Drawing. Application September 5, 1934, Serial No. 742,859

2 Claims. (Cl. 18—54)

This application is a continuation in part of my application, Serial Number 651,632, filed January 13, 1933.

The present invention relates to the manufacture of delustered artificial silk from cellulosic solutions, to which solutions have been added various kinds of pigments, and more particularly the invention is directed to maintaining improved spinning conditions during the process of manufacturing threads, filaments and the like from the said cellulosic solutions.

It is known in the art to deluster artificial silk threads, filaments and the like, by incorporating in the same, various types of pigments such as barium sulphate, zinc sulphide, lithopone, and the oxides of titanium, zirconium, tin, and thorium and the like. These pigments have been utilized and incorporated in the artificial silk during various stages in manufacturing the same. It has even been attempted to add the pigments to the artificial silk filaments after they have been extruded into and through coagulating baths, but such an operation was very impractical, in view of the fact that the pigments did not primarily enter into the filaments to a sufficient degree to produce the desired delustering effects.

It has been generally accepted in the industry after extensive research, that the most desirable results have been obtained by adding the pigment to the cellulosic solution itself prior to filtering and spinning the solution into filaments. This addition may be made either in dry form or first producing a suspension of the pigment and adding the same to the cellulosic solution. The filtering step tends to take out the larger pigment particles and effects a more thorough distribution and dispersion of the particles within the solution and consequently in the spun filament.

Of the various pigments which have been employed in delustering artificial silk, titanium dioxide is considered to be the most desirable because of the fact that it has a very high index of refraction, and therefore produces a relatively great covering power or opacity in the finished filament. For this reason, the invention will be described throughout, as applied specifically to titanium dioxide, although in considering the inventive concept in its broadest aspect, it is intended that this invention will include any pigment which could be substituted for $TiO_2$, but would ordinarily form objectionable agglomerations within the cellulosic solution. When pure pigments such as titanium dioxide have been used in sufficient amounts to produce a fully delustered yarn, serious difficulties have been encountered in commercial production. Fully delustered yarn contains from 1 to 5% of titanium dioxide based on the cellulose content, and even though the pigment particles are initially broken down into an average particle size approximating 0.75 of a micron, after they have been introduced into the cellulosic solution, agglomerations occur which when subsequently extruded through the minute openings in the spinnerettes cause clogging of these openings, and therefore prevent practical spinning conditions. It has been found impossible therefore, to obtain a completely homogeneous distribution of the titanium pigments in a cellulosic solution when employing pure titanium dioxide in sufficient amounts to fully deluster the subsequently formed filaments. As soon as the spinnerettes commence to clog, poor quality yarn results, and the product is commercially undesirable. The operation of removing and cleaning the spinnerettes is a tedious and expensive one, which involves not only loss of time, but also shortens the life of the spinnerettes themselves.

Within recent years the artificial silk industry has gradually gone through a transition period, whereby low luster yarn has substantially taken the place of the high luster yarn. It has been during this period that the demand for the low luster yarn has gradually increased, and has therefore forced the industry to deluster, or form lusterless yarn by employing the various above named pigments, or mixtures of pigments. For a time only very low percentages of the pigments, or mixtures of pigments were used, generally, materially below 1% based on the cellulose content. This resulted in a yarn of only medium luster. When it was ascertained that titanium possessed the most suitable properties for delustering purposes, it was employed alone or with other pigments, but still maintaining the total percent of pigments very low. In no case however, was any pigment successfully used with titanium, for the reason that the combination did not produce a luster as low as when titanium was employed alone.

At the present time two general types of delustered or lusterless yarn are manufactured. The first type is that in which percentages of pigments ranging below 1% have been incorporated in the cellulosic solution. The second type comprises a yarn of very low luster which has been produced from cellulosic solutions containing relatively high percentages of titanium dioxide. This however, presents the difficulties caused by clogging of spinnerettes as described above.

It is an object of the present invention to produce a very low luster yarn in which delustering pigments such as titanium dioxide are employed in percentages preferably above 1%.

The invention further contemplates the incorporation of titanium dioxide in the spinning solution in such a manner that agglomerations are prevented, and therefore, excellent spinning conditions are maintained, and the clogging of the spinnerettes is substantially negligible.

Still another object of this invention is to effect a uniform dispersion of pigment particles within the cellulosic solution.

Other objects and advantages will be apparent from the following detailed description.

The process in the present invention comprises broadly the utilization of titanium dioxide in percentages greater than those hitherto employed, but in every case the specific amounts used are dependent upon the degree of opacity desired in the finished filament. The commercial titanium dioxide which is universally used, upon microscopic examination, proves to consist of two main components: hard aggregates of titanium dioxide, and agglomerations of loosely held individual titanium dioxide particles, the latter do not disperse readily in water, or alkaline solutions. Also, when employing this product in the viscose, a considerable percentage of the agglomerations is not loosened by methods hitherto known. The hard aggregates are rather readily broken down by mechanical means, such as the use of suitable milling equipment. To obtain a uniform dispersion and to prevent a further agglomeration of the pigment particles in the cellulosic solution, barium sulphate is employed in very small quantities, intimately admixed with the titanium dioxide, prior to incorporation into the cellulosic solution.

As in the case where pigments or mixtures of pigments have been employed in small percentages, it is of course necessary in the present process to effect a breaking down of the titanium dioxide pigment particles into a very fine size approximating 0.75 of a micron. It has been found that the fine size of these particles can be maintained and evenly dispersed throughout the cellulosic solution by intimately mixing with the particles, barium sulphate also in very fine form.

One of the suitable methods of carrying out the process would be to employ a special kind of compound pigment made by precipitating barium sulphate in a solution of the desired salt, such as titanium sulphate, and precipitating the desired delustering pigment such as titanium dioxide on to the particles of barium sulphate. This produces an extremely intimate and finely divided mixture of barium sulphate, and titanium dioxide. The ultimate proportions of the barium and titanium may be varied within practical ranges. A very desirable composition which has been found to give excellent results and substantially prevent the clogging of spinnerettes, is as follows:

| | Percent |
|---|---|
| Pigments | 70 |
|   $TiO_2$ 60%–70% | |
|   $BaSO_4$ 30%–40% | |
| Water | 30 |

A measured amount of this paste is introduced into a ball mill, colloid mill, or the like, which contains water for suspending the same. The water is preferably rendered slightly alkaline with caustic soda. To this suspension is added sufficient pure titanium dioxide in powdered form (rayox). The amount of rayox added depends of course on the degree of luster desired in the finished filament. The suspension is thoroughly agitated and mixed by rotating the mill for several hours until all of the hard aggregates are broken down to a practical particle size averaging approximately 0.75 micron.

A desired portion of the suspension is added to the spinning solution, and thoroughly mixed, filtered, and allowed to age for a suitable length of time. It is then extruded through spinnerettes and spun into filaments. The clogging of spinnerettes is substantially negligible, and therefore greatly improved spinning conditions are realized.

As above stated, the amount of titanium dioxide employed is optional, and depends on the degree of luster desired. Preferable ranges of titanium dioxide are from 1 to 5% based on the cellulose content, and the amount of barium sulphate is preferably from 0.1 to 1%. It is desirable and practical that the amount of barium sulphate is maintained as low as possible, as it does not deluster as satisfactorily as titanium dioxide, but is only employed for the purpose of effecting a uniform dispersion and preventing the formation of agglomerations in the spinning solution.

The improved results obtained by the addition of barium sulphate are tabulated below and compiled from a series of experiments. The table represents the number of clogged spinnerettes which occurred over a fixed period.

| $TiO_2$ pigment | | Per cent agglomerations | Per cent clogged spinnerettes |
|---|---|---|---|
| Per cent rayox powder | Per cent $BaSO_4$ and $TiO_2$ paste | | |
| 100 | ---------- | 50–70 | 70–90 |
| 90 | 10 | 25–30 | 20–30 |
| 75 | 25 | 10–20 | 6–12 |
| 50 | 50 | 5–15 | 5–10 |
| ---------- | 100 | 5–12 | 4–10 |

The above table clearly shows that the number of loose agglomerations are materially decreased, and facilitate the commercial production of improved artificial silk filaments. It can further be determined from this table that the decrease in the percent of loose agglomerations and the clogged spinnerettes is the greatest when the amounts of $TiO_2$ employed, drops from 100% to 75% and the $BaSO_4$ increases from 0% to 25% in proportion to each other. It is apparent, therefore, that this is the preferable working range.

Specific proportions which have been prepared in accordance with the present invention are given below by way of example, and have been found to produce very satisfactory results.

*Example.*—12.5 kg. of paste containing 30% water and 70% $TiO_2$ and $BaSO_4$ of which 70% is pure $TiO_2$ and 30% pure $BaSO_4$ is mixed with 14.5 kg. of substantially 100% $TiO_2$. This mixture is suspended in 72 kg. of water made alkaline by the addition of .3 kg. of 50% NaOH and the entire batch of about 80 liters in volume is placed in a ball mill and thoroughly agitated for several hours. The total amount of $TiO_2$ in the batch is approximately 20.6 kg. and $BaSO_4$ is 2.6 kg. The proportion of $TiO_2$ to $BaSO_4$ is approximately 8:1. 15 liters of the batch is added to a tank of viscose of 1400 liters capacity containing about 7% or 113.64 kg. of cellulose and after thorough mixing is ready to be filtered and spun into filaments. The amount of $TiO_2$ in the filaments is approximately 3.4% based on the cellulose content and the amount of $BaSO_4$ is approximately 0.4%.

It is to be understood that the invention is not restricted to the precise proportions as set forth in the preceding examples since it is obvious that the proportions of the pigments may vary within wide limits depending on the degree of opacity or decrease in luster desired.

What I claim is:

1. A process for the manufacture of delustered artificial silk filaments from cellulosic solutions by spinning the same through spinnerettes which comprises incorporating in the cellulosic solution an amount of $TiO_2$ of the order of about 1% or more based on the cellulose content of the solution and an amount of $BaSO_4$ sufficient to substantially prevent the formation of agglomerations of a nature tending to clog the openings in the spinnerettes, and thereafter spinning the cellulosic solution to form filaments, the amount of $BaSO_4$ being approximately 1:8 to the amount of $TiO_2$.

2. A process for the manufacture of delustered artificial silk filaments from cellulosic solutions according to the wet spinning method which comprises incorporating in the cellulosic solution a mixture of $TiO_2$ in amount approximating 3.4% based on the cellulose content of the solution and an amount of $BaSO_4$ approximating 0.4% based on the cellulose content, and thereafter spinning the cellulosic solution to form filaments.

JOHAN D. W. HUBBELING.